United States Patent [19]
Yole

[11] 3,819,998
[45] June 25, 1974

[54] DYNAMIC BRAKING CONTROL SYSTEM
[75] Inventor: Charles S. Yole, Pittsford, N.Y.
[73] Assignee: Xerox Corporation, Stamford, Conn.
[22] Filed: May 16, 1973
[21] Appl. No.: 360,718

Related U.S. Application Data
[63] Continuation-in-part of Ser. No. 253,726, May 16, 1972.

[52] U.S. Cl................. 318/277, 318/375, 318/466
[51] Int. Cl. ............................................ H02p 3/08
[58] Field of Search .......... 318/265, 275, 277, 364, 318/365, 369, 466, 467, 470, 489, 652, 653

[56] References Cited
UNITED STATES PATENTS
| | | | |
|---|---|---|---|
| 2,753,502 | 7/1956 | Kylin | 318/265 |
| 2,790,280 | 4/1957 | Wilson et al. | 318/277 X |
| 2,926,471 | 3/1960 | Bricker | 318/265 X |
| 3,622,854 | 11/1971 | Imai et al. | 318/470 X |

*Primary Examiner*—Robert K. Schaefer
*Assistant Examiner*—W. E. Duncanson, Jr.

[57] ABSTRACT

A dynamic braking control system is provided for the angular positioning of a rotating device in a desired angular orientation. An encoder disc is mounted to rotate with the rotating device and a target area established at a predetermined location on the encoder disc. A logic circuit responds to determination of braking zone locations on the encoder disc for supplying dynamic braking signals to a drive motor employed for driving the rotating device. After the rotating device has stopped, the encoder disc is interrogated to determine whether the rotating device is in the predetermined angular orientation. If not, the rotating device is accelerated until the next braking zone is sensed.

17 Claims, 6 Drawing Figures

DYNAMIC BRAKING CONTROL SYSTEM

BACKGROUND OF THE INVENTION

This application is a continuation-in-part of copending application Ser. No. 253,726, filed May 16, 1972, in the United States Patent Office.

This invention relates to the accurate control of braking mechanisms for rotating devices and more particularly to an apparatus for accurately positioning a rotating device from a rotating condition to a stopped condition at an accurate location.

It is a frequent requirement in many types of industrial and commercial applications employing rotational devices to provide a means for arresting the movement of the rotating device at a specific location. This is particularly true in facsimile data transmission systems wherein a drum which is employed for processing the information must be accurately positioned. Typical prior art devices employing frictional braking, mechanical detents or other types of physical rotational arresting means have often proved to be inaccurate, unreliable and have required continual maintenance and supervision. In automated systems employing digital control signals, it is desirable to provide a means for accurately monitoring the rotational position of a device and to use the monitoring means for generating digital signals for controlling the braking operation. One example of such a system is shown in U.S. Pat. 3,700,990, assigned to the assignee of the present invention.

It is therefore a principal object of the present invention to provide an improved control for non-contact braking of rotational devices.

It is a further object of the present invention to provide a novel braking means for accurately positioning a rotating device with respect to an angular reference.

It is a further object of the present invention to provide a novel and accurate means for utilizing digital control signals for obtaining rotational information.

It is another object of the present invention to provide a system employing digital control signals for controlling and monitoring rotational movement.

SUMMARY OF THE INVENTION

The foregoing and other objects are realized in a system wherein the rotating device is braked, the angular position thereof is checked, and if the device has not stopped within the desired angular window, the device is accelerated. The device is again braked and its angular position again checked. This sequence of steps is repeated until it is determined that the device has stopped within a desired angular window. More specifically, a rotating device or body such as a drum which is employable in a facsimile transceiver system to convey documents, and which is actively rotated by means of a driving motor, is provided with an encoding device rotatable therewith for providing signals indicating the angular position of the rotating body. The sensing of a first logic signal indicating the entry of the drum into a braking zone results in the generation of a suitable braking signal which is coupled to a dynamic braking device for applying a braking force to the motor which stops the rotating body. This braking takes place at a predetermined angular position prior to the final angular target. A predetermined time after the braking signal is generated, logic circuitry samples for a second logic signal from the encoding device to determine whether the drum has stopped within the target window. If so, power is removed from the driving motor. If not, power is applied to accelerate the drum until the first logic signal is again sensed indicating the drum has entered into another braking zone. At this time, the same sequence of events takes place. A predetermined time later the angular position of the drum is sampled to see whether it has stopped within the target window. If so, power is removed; if not, the drum is then accelerated. In one embodiment of this invention, the encoding device defines two windows, corresponding to two braking zones. A single target zone is also defined by the encoding device. The logic circuitry is unaware of which braking zone the drum enters into and therefore simply repeats the process of braking, sampling and accelerating, until the drum stops within the target window. To aid in the process, when the system is operative in the stop mode, the drive source energizing the rotating body driving means is reduced in operative frequency, thereby reducing the inertia of the rotating body by reducing its velocity and torque.

BRIEF DESCRIPTION OF THE DRAWING

The foregoing objects and brief description of the present invention will become apparent from the following more detailed description of exemplary embodiments thereof, in conjunction with the appended illustrations wherein.

DESCRIPTION OF THE ILLUSTRATIVE EMBODIMENT

Figure 1:
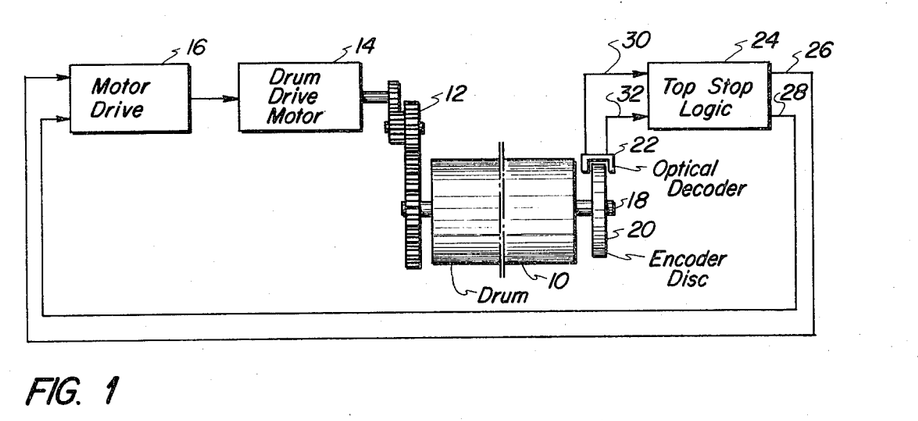
FIG. 1 is a diagram, partly in block form illustrating the energization of various components of the present invention.

Referring now to FIG. 1, a rotating body such as a drum 10 is driven by a gear train 12. The gear train is coupled to and is driven by a drum motor drive unit 14 which is, in turn, energized by a motor driver unit 16. To a central shaft 18 of the drum 10 is attached an encoder disc 20 which is shown as having coupled thereto an optical decoder unit 22. Although the decoder unit is illustrated as an optical device, it would be understood by those skilled in the art that encoders employing conductive and non-conductive contacts, for example in the form of alternating concentric bands, can be employed to derive a digital indication of the rotary position of the central shaft 18. Similarly, magnetic pick-off detectors may be employed. Further, other means or modes of detecting angular shaft position by shaft encoder techniques are similarly well known to those skilled in the art and may be employed within the meaning and context of the present invention.

Coupled to the optical encoder output is a logic circuit 24 which responds to signals supplied from the optical decoder 22 for providing suitable output signals. These output signals are coupled along the lines 26 and 28 to the input of the motor drive unit 16, which responds to arrest the rotation of the drum. The logic circuit 24 is provided with first and second inputs 30 and 32. Signals derived from the optical decoder indicating entry into first and second braking zones are applied along the input line 30. The second input line 32 receives an output signal from the decoder 22 indicating when the drum has reached its desired stop position, referred to hereinafter as a top stop.

Figure 2:
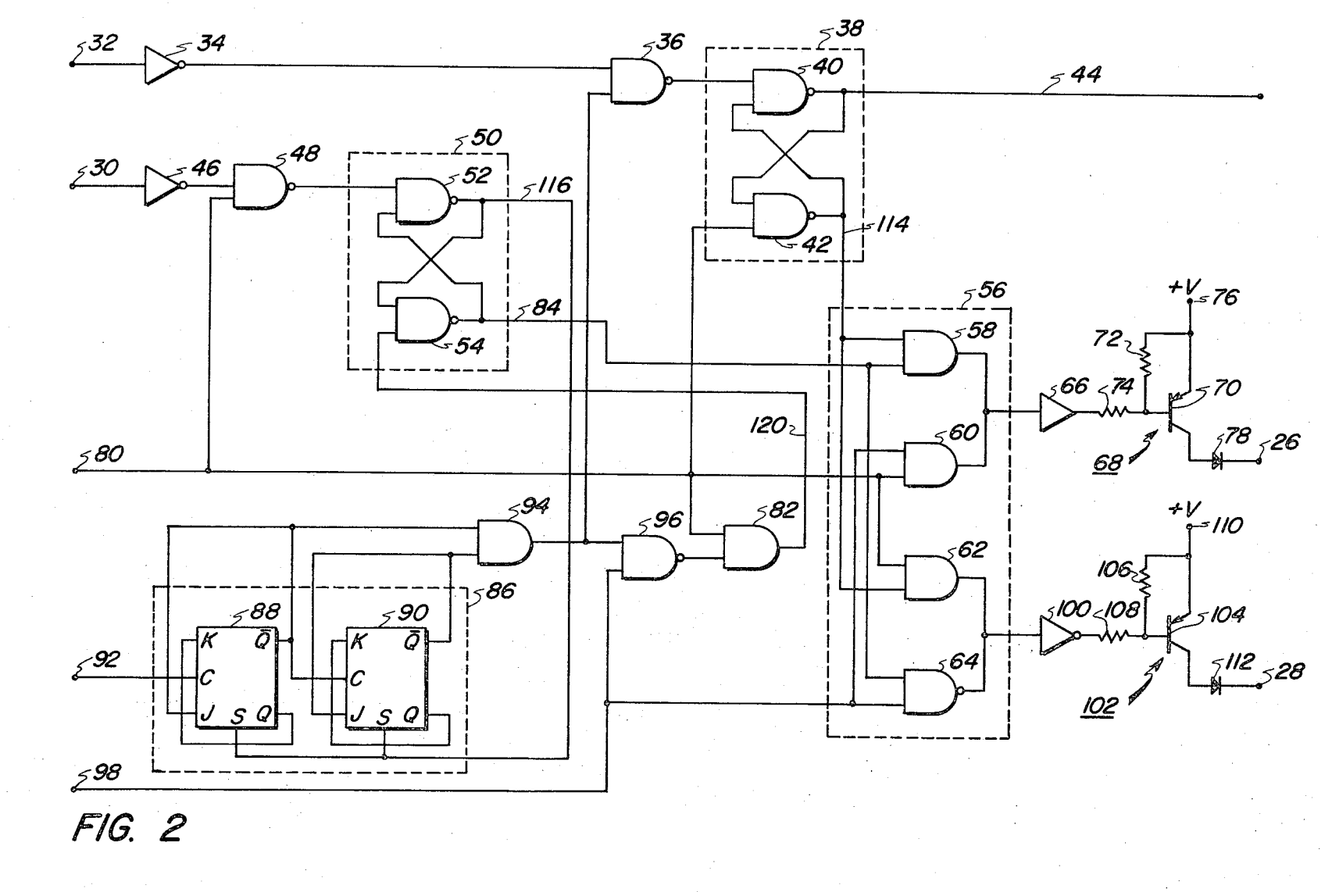
FIG. 2 is a schematic illustration of a logic arrangement which may be employed with the present invention.

Referring to FIG. 2, a logic circuit for producing the appropriate logic signals in response to decoded signals from the encoder disc is illustrated in greater detail. Each of the gates illustrated in FIG. 2 is of either the NAND or AND gate configuration. It will be appreciated however that other forms and arrangements of logic gating can be used to accomplish the same logical function, and that the preferred embodiment shown is not intended to be exclusive nor limiting.

As shown in FIG. 2, top stop zone signals are applied along the input line 32 through an inverter amplifier 34 to a first input of NAND gate 36. The output of the NAND gate 36 is coupled to a top latch circuit 38 consisting of cross-coupled NAND gates 40 and 42. The output of the latch 38 provides an output signal along the line 44 indicating that the rotating drum has stopped in a desired predetermined location.

Braking zone signals derived from the decoder are applied along the input line 30 through an inverter amplifier 46 to a first input of a NAND gate 48. The output of the NAND gate 48 is coupled to a brake latch circuit 50 consisting of cross-coupled NAND gates 52 and 54. The output 84 of the latch circuit 50 is coupled to a NAND gate logic chain 56 consisting of AND gates 58, 60, 62 and a NAND gate 64. The common output of the AND gates 58 and 60 is coupled through an inverter amplifier 66 to a transistor switching circuit 68 which consists of a PNP transistor 70 and biasing resistors 72 and 74. A potential +V is coupled via terminal 76 to the emitter electrode of the transistor 70. The collector electrode of the transistor 70 is coupled through a diode 78 to the output terminal 26.

An input signal initiating a stop operation is applied to the logic circuit from an external source, such as a manually operated switch, automatic signal, etc., along an input line 80 to a further input of the NAND gate 48, to the top latch circuit 38, and to AND gates 60 and 62 of the logic chain 56. This input signal is further coupled to an AND gate 82 which in turn has its output fed back to one input of the brake latch circuit 50.

Timing in the logic circuitry is accomplished by virtue of a counter unit 86 consisting of first and second JK flip-flops 88 and 90 interconnected so as to perform a counting function. A 30 Hz input is applied from the input terminal 92 to the clock input of the flip-flop 88, and an output derived from each of the flip-flops 88 and 90 is applied to the input of AND gate 94. The output of the AND gate 94 is coupled in turn to the input of a NAND gate 96 and to a further input of the NAND gate 36. To the other input of the NAND gate 96 is coupled a 60 Hz input waveform applied along the input line 98. The 60 Hz wave is also applied to the logic chain 56, and specifically to the inputs of the gates 60 and 64 therein. A further output of the logic chain 56 is applied to the inverter unit 100 and thence to a transistor circuit 102 comprising PNP transistor 104 and biasing resistors 106 and 108. The emitter electrode of the transistor 104 has applied thereto a potential +V from a terminal 110. The collector electrode of the transistor 104 is coupled through a diode 112 to the output terminal 28.

The input signal on line 80 is used to command the logic to enter a stop mode. This signal is normally a logical zero and is applied to the input of the gates 82 and 42 to clear the brake latch 50 and the top latch 38. A logical one therefore appears at the output 84 of the brake latch 50, and a logical zero at the output 116 of the brake latch 50. A logical zero appears along the output line 44 of the top latch 38 and a logical one appears along the output line 114 of the top latch 38. Application of the logical zero input to the gates 60 and 62 received from the input line 80 will result in a logical zero input to the inverters 66 and 100 respectively. The resultant one at the base electrode of the transistor 70 and transistor 104 respectively is designed to maintain the transistors 70 and 104 in their off condition. As a result, the signals at the output terminals 26 and 28 do not occur.

During normal operation, the drive unit 16 is operating the motor 14 at full power at 120 Hz rate from an external source not shown. When it is desired to enter the stop mode, the input signal along line 80 is switched from a logical zero to a logical one, causing a change in input condition to the gates in the logic chain 56, thereby rendering transistors 70 and 104 conductive in accordance with the 60 Hz input applied along line 98 to the gates 60 and 64. The output appearing at the terminals 26 and 28 are coupled to the motor drive 16 for causing rotation of the drum at the 60 Hz rate. The external 120 Hz source is disconnected at this time by circuitry not shown. The application of the lower frequency to the motor armature causes a retardation effect. This is the initial braking phase.

When the first braking window is detected, the input along line 30 shifts to a logical zero. The output of the inverter 46 is then a logical one which when applied to the input of the NAND gate 48 along with the logical one applied along the input terminal 80 results in an output logical zero which in turn sets the brake latch 50. As a result of setting the brake latch 50, line 84 goes to zero, AND gate 58 becomes blocked, whereas the output of the NAND gate 64 is a logical one. The output of inverter 100 is a logical zero, and transistor 104 is thus turned on. Thus, the transistor 70 is turned off whereas the transistor 104 is maintained on, and the output from terminal 26 is low whereas the potential at output terminal 28 is relatively high. The output terminals 26 and 28 are each coupled to a respective portion of a drum motor drive winding, and thus power is applied only across one winding of the drum motor, leaving the second unenergized. As is well known, energization of only a single winding, while the second winding is unenergized, results in dynamic braking of the drum motor, causing it to stop.

The setting of the brake latch 50 also results in the enabling of the counter 86 by means of logical one supplied along the line 116 to the input terminals S of the flip-flops 88 and 90. The counter 86 is set to count to three, thus establishing for the system a sample time frame within which to operate. This time period is chosen in order to allow the drum to stop within the period. The counter 86 counts in accordance with the 30 Hz clock pulse supplied along the input line 92. When the counter reaches a count of 3 the $\bar{Q}$ output of both flip-flops 88 and 90 exhibit a state of logical one and the AND gate 94 then produces a logical one output. This period of logical one output defines a sample time frame. If, during this sample time frame, rotation has stopped in the top stop position desired, a logical zero will be applied along the line 32, converted into a logical one by the inverter 34, and applied to the input of the NAND gate 36. The coincidence of logical ones at the input of the NAND gate 36 will produce a logical zero at the output, thereby changing the state of the top latch 38 and allowing the output along the line 44 to go from a zero to a one indicating a top stop has been reached. At the same time, the logical zero appearing along the line 114 results in a cut off of transistors 70 and 104, thereby removing power from both terminals 26 and 28. The sample time frame ends when the next half cycle of 60 Hz input along the line 98 that appears after the gate 94 has produced a logical one. This produces a logical one at the input of the NAND gate 96 and results in the output of the NAND gate 96 achieving a logical zero condition. This condition is applied to the input of the AND gate 82 which receives a logical one from the input line 80 thereby applying a logical zero along the line 120 to the input of the brake latch 50. The brake latch 50 is reset, and the counter is turned off by means of a pulse supplied along line 116 from the output of the brake latch 50. If during the sample time frame, after the counter achieved a state corresponding to a count of three, the top latch 38 had not been reset by a low condition appearing along line 32 indicating that the rotational device had not achieved its proper top stop condition, then the logic will again be in the same condition as when the logic input on line 80 first switched to one and outputs along lines 26 and 28 will again apply 60 Hz power to the motor until a logic input is again achieved along line 30 indicating the appearance of a second braking window.

Thus, a cycle is repeated for the second braking window detection. Upon completion of the second braking window cycle, counter 86 again sets up a three count, at the end of which a sample time frame tests for the presence of a logic signal on line 32. Failure of the signal to appear on line 32 during this sample time frame causes the entire circuit to reset and thereby apply 60 Hz power to the motor drive, repeating the cycle until the first braking window is again achieved. If a signal on line 32 does appear during the sample time frame, indicating the drum has stopped in the top stop position, the top latch state is changed, and provides an appropriate signal on line 44 indicating that a top stop has been achieved.

When the top stop is achieved, the signal appearing on line 44 is employed to effect a desired operation. If, for example, the rotating drum is employed in a facsimile transmission or receiving unit, the signal on line 44 could be employed to indicate that the unit is now in position to remove a document from the drum and enter a new document, or the like.

Figure 3:
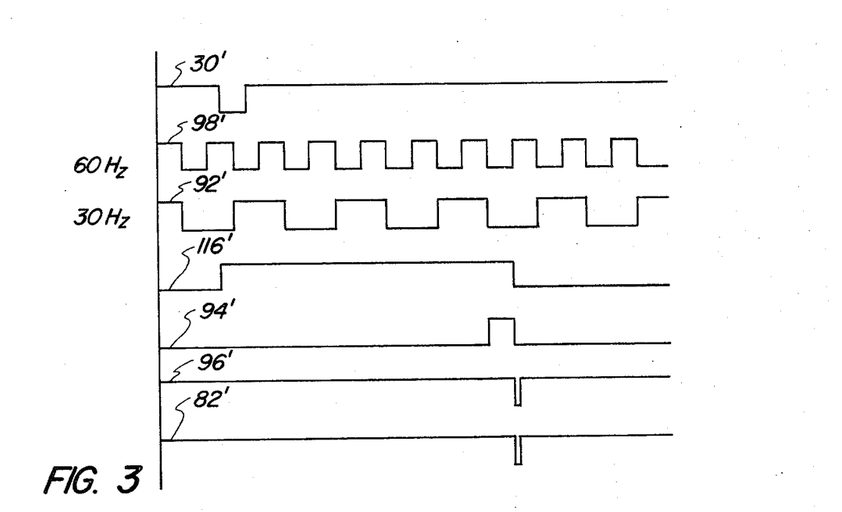
FIG. 3 is a timing diagram illustrating the timing of signals occuring with the logic arrangement of FIG. 2.

The foregoing relationships are illustrated in the brake duration timing diagram of FIG. 3. The use of primed reference numerals is intended to refer to the signal equivalents of corresponding unprimed elements as illustrated in FIG. 2. Thus, the appearance of a braking signal as shown on line 30' acts to set the brake latch output signal 116' which remains in its set condition for a duration sufficient to count three 30 Hz pulses shown as pulses 92'. At the termination of the third counting pulse 92' the signal at the output of the gate 94, 94', is set. The duration of this set period defines the sample window time frame for determining if a top stop has been achieved. At the next excursion of the 60 Hz waveform 98' the signal 94' is reset and the signals 96' and 82' are activated for a sufficient duration to reset both the counters 86 and the brake latch 50 as described above.

Figure 4:
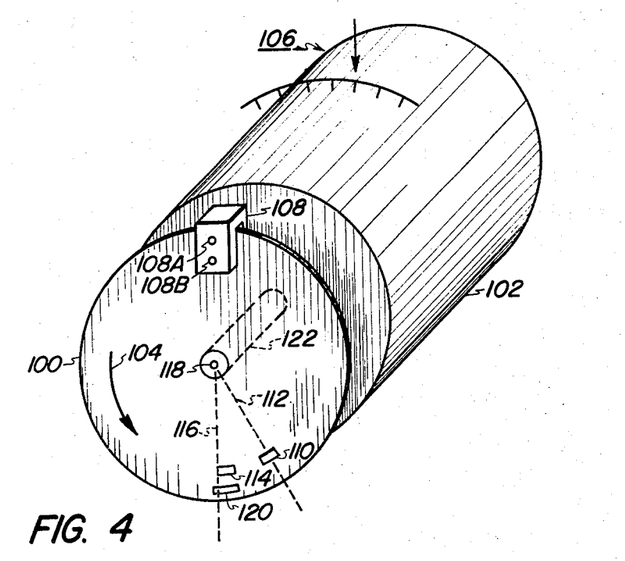
FIG. 4 shows an isometric view of an encoder disc with braking windows which may be employed with the present invention.

Referring now to FIG. 4, an encoder disc is illustrated showing the relationship of the top stop window and braking windows. Thus, as shown in FIG. 4 an encoder disc 100 is provided which is physically mounted to a rotating device such as the drum 102. The drum 102 is driven by suitable motor drive units, not shown. The encoder disc is assumed to rotate in the direction indicated by the arrow 104 and it is desired to stop the drum at a predetermined target area or top stop position indicated by the arrow and dimension scale 106. In the preferred embodiment, a photoelectric unit 108 is fixedly mounted to an external frame or the like, not shown, and is designed to provide the necessary optical signal for detecting the braking windows. In this case, the braking windows may consist of apertures within the encoder disc which are sufficient to pass optical energy from a source of light to a suitable detector mounted on opposite sides of the encoder.

The encoder disc 100 includes a first braking zone window 110 positioned along a first radial 112, a second braking zone window 114 positioned along a second radial 116. The braking windows 110 and 114 are designed to be the same radial distance from the center of the encoder disc 118. A top stop zone indicating window 120 is positioned on the encoder disc 100 along the radial 116 at a distance in excess of the distance of the second braking window 114 from the center 118.

In operation, rotation of the drum 102 produces corresponding rotation of the encoder disc 100 by virtue of a shaft 122 mechanically interconnecting the disc and the drum. It would be apparent that other means, modes and methods of providing rotation of an encoder disc corresponding to rotation of the drum may be used, the direct connection shown being for illustrative purposes only. It should be further evident that the encoder disc although shown as the same diameter as the drum may be larger or smaller and the relative size thereof forms no part of this invention. Rotation of the disc 100 in the direction of the arrow 104 results in placing the first braking window 110 beneath the encoder unit 108. Activation of the first braking signal occurs at this time thereby braking as described above. Braking continues for a time frame initiated by the leading edge of the window and continuing for the duration of the count cycle of the counter 86. If no signal appears along line 32, indicating a top stop after the time frame period, 60 Hz power is again applied to the motor drive and the drum 102 begins to accelerate. Upon reaching the leading edge of the second braking window, braking is again applied for the duration of the count cycle. Again, if no signal appears along line 32, indicating a top stop after the counter time frame period, the rotation cycle is repeated.

It should be understood that although the detector 108 is indicated as being aligned with the desired top stop position 106, the detector 108 may be positioned anywhere along the circumference of the encoder 100, as long as the mechanical relationship between the drum 102 and the encoder disc 100 has been predetermined such that the detector 108 will detect the position of the top window 120 and associated braking windows with a relationship such that the drum will stop in its desired location.

Figure 5:
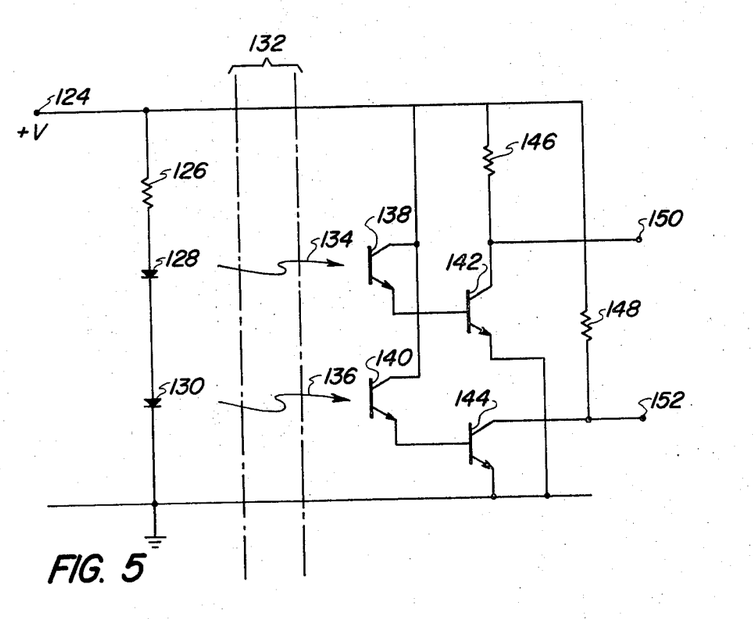
FIG. 5 is a circuit diagram of a photo circuit which may be used as a braking window detector.

Referring now to FIG. 5, a typical circuit which may be employed for use in the photodetector 108 is illustrated. The circuit employs light emitting diodes and solid state photodetectors, as these have been found to exhibit the greatest degree of reliability in an essentially electromechanical system such as employed within the present invention. As illustrated, a source of potential is applied at the terminal 124 causing a current flow through current limiting resistor 126 and light emitting diodes 128 and 130. The light traverses the gap area 132 through which the window apertures are designed to pass. The passage of light 134 and 136 from the respective diodes 128 and 130 strike the sensitive base electrode of a first photosensitive transistor 138 and a second photosensitive transistor 140. By means of conventional charge carrying action created by impinging light upon the sensitive areas of the phototransistors, each phototransistor receiving appropriate light will react thereto by allowing a current flow to be supplied to the base electrode of corresponding switching transistors 142 and 144, each of which are respectively connected to the source of potential 124 through resistors 146 and 148. The action of the switching of transistors 142 and 144 will change the state of the output terminals 150 and 152. Depending upon the configuration of the light emitting diodes, the outputs 150 and 152, respectively may each represent electrical outputs corresponding to the position of photodetectors 108a and 108b in the detecting unit 108 shown in FIG. 4, and corresponding to the inputs applied to the terminals 30 and 32 in FIG. 2.

Figure 6:
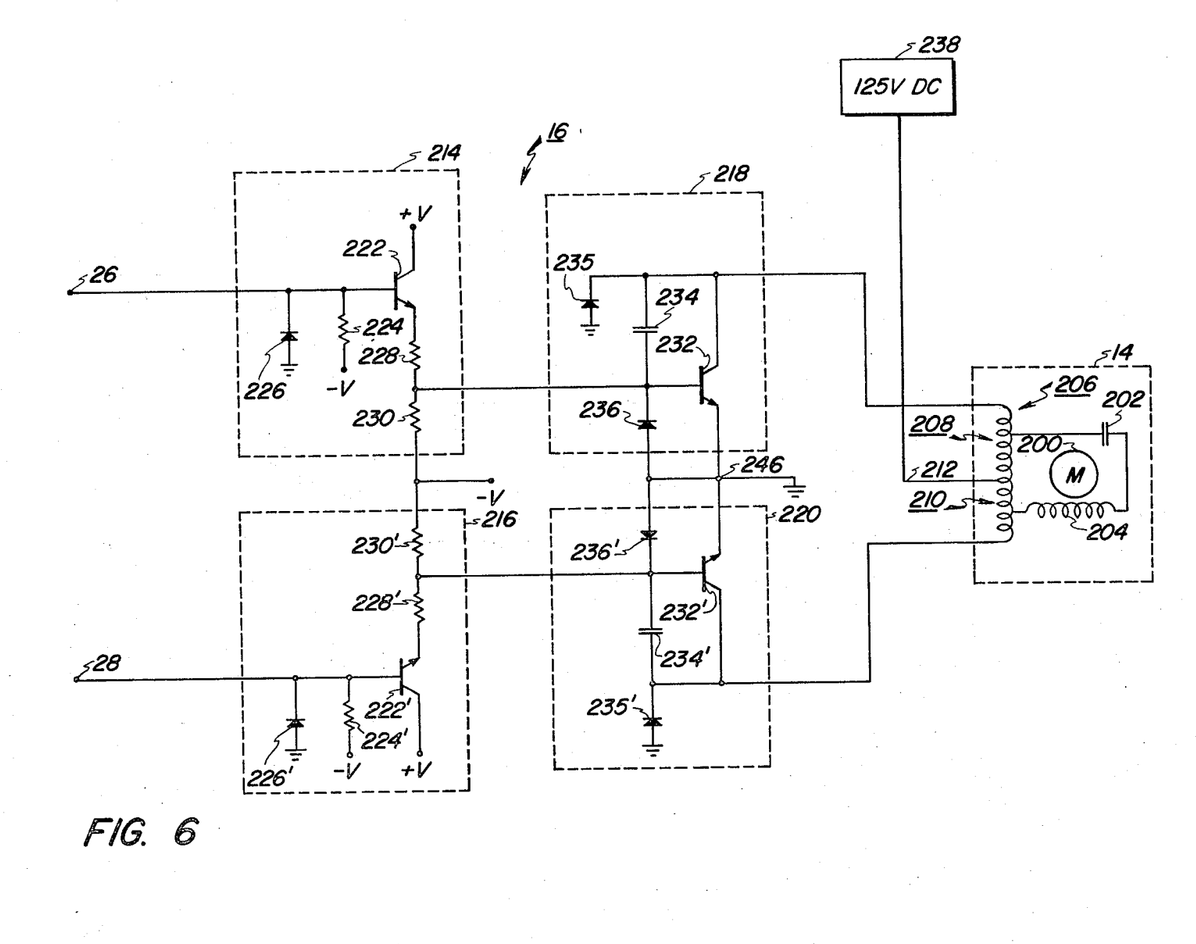
FIG. 6 is a circuit diagram of illustrative drive circuitry which may be employed with the present invention.

Referring now to FIG. 6, the relationship of the output of the logic circuit 24 to the motor driving unit 16 and the drum motor 14 are illustrated in greater detail. As was noted hereinabove, the drum drive motor is usually driven at a frequency of 120 Hz under power. When it is desired to initiate the operation of a top stopping mode, the frequency of the power drive to the motor is shifted to 60 Hz thereby reducing the inertial forces exerted by the motor and enabling more precise and rapid braking to occur. The motor 14 as illustrated is a conventional split phase capacitor motor including an armature 200, capacitor 202, first phase winding 204, and a second phase winding 206 which includes a first portion 208 and a second portion 210 separated by a center tap 212. The motor control unit 16 includes first and second switching circuits 214 and 216 which are in turn coupled to first and second driving circuits 218 and 220. The inputs to the switching circuits 214 and 216 are derived from the terminals 26 and 28 which correspond to the like numbered terminals in FIG. 2 and from which the braking signal is derived. Switching circuit 214 includes a transistor 222 biased by a positive source of potential +V. The base electrode of the transistor is clamped by means of a resistor 224 and a diode 226 coupled between a source of potential −V and ground. Logic circuit 216 contains like components which have been designated with a prime subscript. Interconnecting the emitter electrodes of transistors 222 and 222' is a series chain of resistances 228, 230 and their corresponding primes 228' and 230'. The junction between resistances 230 and 230' is coupled to a source of potential −V. The drive circuits 218 and 220 each include a transistor 232 and 232' having their respective base electrodes coupled to the junction of resistors 228 and 230 and 228' and 230'. Switching time of these transistors is imporved by the use of capacitor units 234 and 234' interconnecting the collector and base electrode to the respective transistors 232 and 232'. Diodes 235 and 235' prevent the potential at the collector electrodes of transistors 232 and 232' from going below ground potential by more than the voltage drop across the diode. Base electrodes of the transistors 232 and 232' are connected to ground by means of diodes 236 and 236' respectively.

The motor unit 14 is energized by means of an appropriate voltage applied across winding 206. Power is applied along the input line 212 which is in turn derived from a DC source of potential 238 which provides a 125 volt level. Transistors 232 and 232' conduct alternately, 180° out of phase, for providing a closed loop path for source 238 to the ground point 246. When the first braking signal is applied to the terminal 26, the effect is to remove the input from the terminal 26. At this point, the action of the resistor 224 and diode 226 operate to turn off the transistor 222 and thereby place a negative source of potential from the point −V through the resistor 230 to the junction of the resistance 228 and 230. The appearance of the negative potential at the base electrode of the transistor 232, resulting from the voltage drop across the diode 236, will be sufficient to turn off the transistor 232 and thereby effectively remove the application of potential from the winding portion 208 of the winding 206. Removal of potential from one half of the winding will cause dynamic braking in the manner described above. When this braking phase ends, power is restored to the winding 208. Upon reaching the second window, input signal is again lost on terminal 26, and the braking phase resumes. The top stop window effects complete shut down of power to windings 208 and 210, loss of power to the other half of the winding 210 occurring as described in connection with loss of power on terminal 28.

It should be apparent from the foregoing descriptions that variations of the disclosed embodiments are within the scope of the skilled practitioner. Thus, for example, additional braking windows may be provided in predetermined locations around the periphery of the encoder disc for the generation of signals which may be applied to appropriate switching and drive circuitry such as is illustrated in FIG. 6 for the application and removal of potential to the windings of the motor 14.

Accordingly, there has been disclosed apparatus for controlling a rotating device to stop in a predetermined angular orientations. This apparatus senses a braking zone, dynamically brakes the rotating device to a halt, and samples to determine whether the drum has stopped in the predetermined angular orientation. If so, power is removed. If not, power is reapplied to accelerate the drum until another braking zone is sensed.

While this invention has been particularly shown and described with reference to an exemplary embodiment and variations thereof, it will be obvious to those skilled in the art that the foregoing examples as well as sug-

What is claimed is:

1. A braking method for stopping a rotating device in a predetermined angular orientation, comprising the steps of
   a. providing a first signal indicating the entry of said device into a braking zone,
   b. providing a second signal indicating said device is in said predetermined angular orientation,
   c. braking said rotating device in response to the presence of said first signal,
   d. sampling for said second signal a predetermined time after the occurrence of said first signal,
   e. accelerating said device in response to the absence of said second signal during said sampling, and
   f. repeating steps (a) through (e) until the occurrence of said second signal during said sampling.

2. The method of claim 1 further including the step of removing power from said device in response to the presence of said second signal during said sampling.

3. The method of claim 2 wherein the sampling step includes the steps of
   providing a series of fixed rate clock pulses, and
   counting a predetermined number of said clock pulses in response to said first signal.

4. A braking control system for a rotating device comprising,
   an angle encoder coupled to said rotating device for rotation therewith, said encoder defining a first angular braking zone, a second angular braking zone, and an angular stop zone,
   detector means mounted in cooperative relation with said encoder for providing a first signal indicating the presence of said first or said second braking zones at a predetermined angular position and a second signal indicating the presence of said stop zone at said predetermined angular position,
   braking means coupled to said detector means and responsive to said first signal for braking said rotating device, and
   further means responsive to the presence of said second signal a predetermined time after the presence of said first signal for removing power from said rotating device.

5. The system of claim 4 further including means responsive to the absence of said second signal at said predetermined time for accelerating said rotating device.

6. The system of claim 5 wherein said rotating device is driven by a motor including a winding comprising a first portion and a second portion and said braking means includes means for removing power from said first portion of said winding.

7. The system of claim 6 wherein said further means includes
   a clock source providing a series of pulses at a fixed rate,
   counting means responsive to said first signal for defining said predetermined time by counting said pulses and providing an output signal when a predetermined number of said pulses have been counted, and
   means responsive to the concurrence of said output signal and said second signal for removing power from said second portion of said winding.

8. The system of claim 6 wherein said accelerating means includes means for reapplying power to said first portion of said winding.

9. A control system for a rotating device, said control system acting to initially drive said device at a first speed and to stop said device in a predetermined angular orientation in response to a stop signal, said control system comprising
   motor means for rotating said device, said motor means including a first and a second winding,
   first means for supplying power to both said windings of said motor means at a first frequency to rotate said device at said first speed,
   second means responsive to said stop signal for supplying power to both said windings of said motor means at a second frequency instead of said first frequency to rotate said device at a second speed, said second frequency being less than said first frequency so that said second speed is less than said first speed,
   an angle encoder coupled to said rotating device for rotation therewith, said encoder defining a first angular braking zone, a second angular braking zone, and an angular stop zone,
   detector means mounted in cooperative relation with said encoder for providing a first signal indicating the presence of said first or said second braking zones in said predetermined angular orientation and a second signal indicating the presence of said stop zone in said predetermined angular orientation,
   braking means responsive to said stop signal and said first signal from said detector means for controlling said second means to remove power from said first winding,
   timing means responsive to said first signal for providing an output signal a predetermined time after the occurrence of said first signal,
   sampling means responsive to said output signal for sampling for said second signal and providing a sample signal at a first level in response to the presence of said second signal and at a second level in response to the absence of said second signal,
   means responsive to said sample signal at said first level for controlling said second means to remove power from said second winding, and
   means responsive to said sample signal at said second level for controlling said second means to resupply power to said first winding.

10. In a facsimile apparatus utilizing a driven drum having gripper means for document conveyance, apparatus for controlling the drum driver to stop said drum in a predetermined angular orientation, comprising
    an angle encoder coupled to said drum for rotation therewith, said encoder defining a first angular braking zone, a second angular braking zone, and the angular position of said gripper means,
    detector means mounted in cooperative relation with said encoder for providing a first signal indicating the presence of said first or said second braking zones at a predetermined angular position and a second signal indicating the presence of said gripper means at said predetermined angular position,
    braking means coupled to said detector means and responsive to said first signal for braking said drum driver, and further means responsive to the presence of said second signal a predetermined time after the presence of said first signal for removing power from said drum driver.

11. The system of claim 10 further including means responsive to the absence of said second signal at said predetermined time for accelerating said drum driver.

12. A system for stopping a rotating device in a predetermined angular orientation comprising
first means responsive to the entry of said device into a braking zone for providing a first signal,
second means responsive to said device being in said predetermined angular orientation for providing a second signal,
braking means responsive to said first signal for braking said device,
sampling means responsive to said first signal for sampling for the occurrence of said second signal a predetermined time after the occurrence of said first signal, and
means responsive to said sampling means for accelerating said device in response to the absence of said second signal at said predetermined time.

13. The system of claim 12 further including stopping means responsive to said sampling means for removing power from said device in response to the presence of said second signal at said predetermined time.

14. The system of claim 13 wherein said sampling means includes
clock means providing a series of fixed rate clock pulses, and
means for counting a predetermined number of said clock pulses in response to said first signal.

15. The system of claim 14 wherein said rotating device includes a motor having a first winding and a second winding and said braking means includes means for removing power from said first winding.

16. The system of claim 15 wherein said accelerating means includes means for supplying power to said first winding.

17. The system of claim 15 wherein said stopping means includes means for removing power from said second winding.

* * * * *